(12) United States Patent
Kallio et al.

(10) Patent No.: US 7,672,693 B2
(45) Date of Patent: Mar. 2, 2010

(54) CONTROLLING METHOD, SECONDARY UNIT AND RADIO TERMINAL EQUIPMENT

(75) Inventors: Janne Kallio, Pattijoki (FI); Jarmo Saari, Turku (FI); Tommi Raussi, Halikko (FI); Ossi Mäenpää, Salo (FI); Markus Vaalgamaa, Helsinki (FI); Erkki Paajanen, Tampere (FI); Kimmo Kaukoranta, Lempäälä (FI); Andrew Bright, Helsinki (FI)

(73) Assignee: Nokia Corporation, Espoo (FI)

( * ) Notice: Subject to any disclaimer, the term of this patent is extended or adjusted under 35 U.S.C. 154(b) by 949 days.

(21) Appl. No.: 10/705,077

(22) Filed: Nov. 10, 2003

(65) Prior Publication Data

US 2005/0101357 A1   May 12, 2005

(51) Int. Cl.
*H04M 1/00* (2006.01)
*H04B 7/24* (2006.01)
*H04B 7/00* (2006.01)

(52) U.S. Cl. .................. 455/569.1; 455/556.1; 455/39; 455/41.2; 455/41.3

(58) Field of Classification Search .................. 381/58, 381/56, 82; 340/825.61; 455/556.1, 569.1, 455/39, 41.2, 41.3
See application file for complete search history.

(56) References Cited

U.S. PATENT DOCUMENTS 6,071,123 A * 6/2000 Tallal et al. .................. 434/116
6,091,826 A * 7/2000 Laitinen et al. ................ 381/82
6,990,190 B2 * 1/2006 Mauney et al. ......... 379/392.01
2002/0061744 A1   5/2002 Hamalainen et al.
2003/0131065 A1   7/2003 Neufeld et al.
2003/0171834 A1 * 9/2003 Silvester ...................... 700/94

FOREIGN PATENT DOCUMENTS

| EP | 1100249 | 5/2001 |
| EP | 1 209 932 A2 | 5/2002 |
| WO | WO 00/72463 A2 | 11/2000 |
| WO | WO 03/047172 A1 | 6/2003 |
| WO | WO 03/098851 A1 | 11/2003 |

OTHER PUBLICATIONS

Specification of the Bluetooth System, version 1.1, Part K:6, Headset Profile, Feb. 22, 2001, pp. 199-226, XP002277008.
Office Action from Ep application no. 04 798 272.Mar. 2412 dated 08.12.2009, 6 pp.

* cited by examiner

*Primary Examiner*—Vivian Chin
*Assistant Examiner*—George C Monikang
(74) *Attorney, Agent, or Firm*—Hollingsworth & Funk, LLC

(57) ABSTRACT

Radio terminal equipment of a communication system, the communication system comprising one or more secondary units coupled to the radio terminal equipment, the radio terminal equipment comprising: means for receiving information on audio characteristics optimising an audio signal of the secondary unit, means for converting the audio characteristics information into a form of an audio control algorithm used in the radio terminal equipment for performing a secondary unit audio control algorithm, means for optimising an audio signal of the secondary unit by using the secondary unit audio control algorithm.

19 Claims, 2 Drawing Sheets

US 7,672,693 B2

CONTROLLING METHOD, SECONDARY UNIT AND RADIO TERMINAL EQUIPMENT

FIELD

The invention relates to a method for controlling a communication system, the communication system comprising at least one unit of radio terminal equipment and one or more secondary units coupled to the radio terminal equipment. The invention also relates to a secondary unit and radio terminal equipment.

BACKGROUND

Mobile devices divided into several parts that are used in various combinations are being developed. Multipart radio terminals, for example, may include a cellular core unit and a number of optimised peripheral units. The peripheral units of the multipart radio terminals are optimised for specific tasks and the peripheral units are typically connected to a core unit by low-power radio frequency (LPRF) connections, such as Bluetooth connections. One of the peripheral units may be optimised for making basic phone calls and another peripheral unit may be optimised for messaging and browsing or for imaging and music, for example. Typical mobile phones may also comprise several enhancement devices, such as headsets, pens, and web pads that communicate with the mobile phone over wireless connections.

Since there are many different kinds of peripheral units or usage modes, the audio characteristics of the system need to be adjusted as smooth and flexible as possible.

BRIEF DESCRIPTIONS OF THE INVENTION

The invention provides an improved method for controlling a communication system, a secondary unit and radio terminal equipment thereof. According to an embodiment of the invention, there is provided a method for controlling a communication system, the communication system comprising at least one unit of radio terminal equipment and one or more secondary units which secondary units are coupled to the radio terminal equipment, the method comprising: storing audio characteristic information determining audio modes in the radio terminal equipment, informing the radio terminal equipment of an audio mode of a secondary unit, setting audio properties of the secondary unit by the radio terminal equipment by using audio characteristic information corresponding to the informed audio mode.

According to another embodiment, there is provided a method for controlling a communication system, the communication system comprising at least one unit of radio terminal equipment and one or more secondary units which secondary units are coupled to the radio terminal equipment, the method comprising: storing audio characteristics information in a secondary unit, informing the radio terminal equipment of audio characteristics information optimising an audio signal of the secondary unit, converting the audio characteristics information into a form of an audio control algorithm used in the radio terminal equipment for performing a secondary unit audio control algorithm, optimising an audio signal of the secondary unit by using the secondary unit audio control algorithm.

According to another embodiment, there is provided a secondary unit of a communication system, the secondary unit being coupled to radio terminal equipment, the secondary unit comprising: means for defining an audio mode, means for informing the radio terminal equipment of the audio mode.

According to another embodiment, there is provided a secondary unit of a communication system, the secondary unit being coupled to radio terminal equipment, the secondary unit comprising: means for storing audio characteristics information, means for informing the radio terminal equipment of audio characteristics information optimising an audio signal of the secondary unit.

According to another embodiment, there is provided radio terminal equipment of a communication system, the communication system comprising one or more secondary units coupled to the radio terminal equipment, the radio terminal equipment comprising: means for storing audio characteristic information determining audio modes, means for receiving information on an audio mode of a secondary unit optimising an audio signal of a secondary unit, means for setting audio properties of the secondary unit by using the received information on the audio mode.

According to another embodiment, there is provided radio terminal equipment of a communication system, the communication system comprising one or more secondary units coupled to the radio terminal equipment, the radio terminal equipment comprising: means for receiving information on audio characteristics optimising an audio signal of the secondary unit, means for converting the audio characteristics information into a form of an audio control algorithm used in the radio terminal equipment for performing a secondary unit audio control algorithm, means for optimising an audio signal of the secondary unit by using the secondary unit audio control algorithm.

According to another embodiment, there is provided a secondary unit of a communication system, the secondary unit being coupled to radio terminal equipment, the secondary unit comprising: defining means defining an audio mode, informing means informing the radio terminal equipment of the audio mode.

According to another embodiment, there is provided a secondary unit of a communication system, the secondary unit being coupled to radio terminal equipment, the secondary unit comprising: storing means storing audio characteristics information, informing means informing the radio terminal equipment of audio characteristics information optimising an audio signal of the secondary unit.

According to another embodiment, there is provided radio terminal equipment of a communication system, the communication system comprising one or more secondary units coupled to the radio terminal equipment, the radio terminal equipment comprising: storing means storing audio characteristic information determining audio modes, receiving means receiving information on an audio mode of a secondary unit optimising an audio signal of a secondary unit, setting means setting audio properties of the secondary unit by using the received information on the audio mode.

According to another embodiment, there is provided radio terminal equipment of a communication system, the communication system comprising one or more secondary units coupled to the radio terminal equipment, the radio terminal equipment comprising: receiving means receiving information on audio characteristics optimising an audio signal of the secondary unit, converting means converting the audio characteristics information into a form of an audio control algorithm used in the radio terminal equipment for performing a secondary unit audio control algorithm, optimising means optimising an audio signal of the secondary unit by using the secondary unit audio control algorithm.

The method and system of the invention provide several advantages. In one embodiment of the invention, it is possible to use radio terminal equipment, which does not originally have required characteristics, such as software or memory capacity, as a core unit of a multipart system. In another embodiment, there is no need to have a memory unit in a secondary unit, and the message adjusting the audio characteristics can be relatively short, containing only the audio modes.

LIST OF DRAWINGS

In the following, embodiments of the invention will be described in greater detail with reference to preferred embodiments and the accompanying drawings, in which FIG. 1 shows an example of a structure of a radio system and a radio terminal equipment arrangement according to an embodiment of the invention;

DESCRIPTION OF EMBODIMENTS

Figure 1:
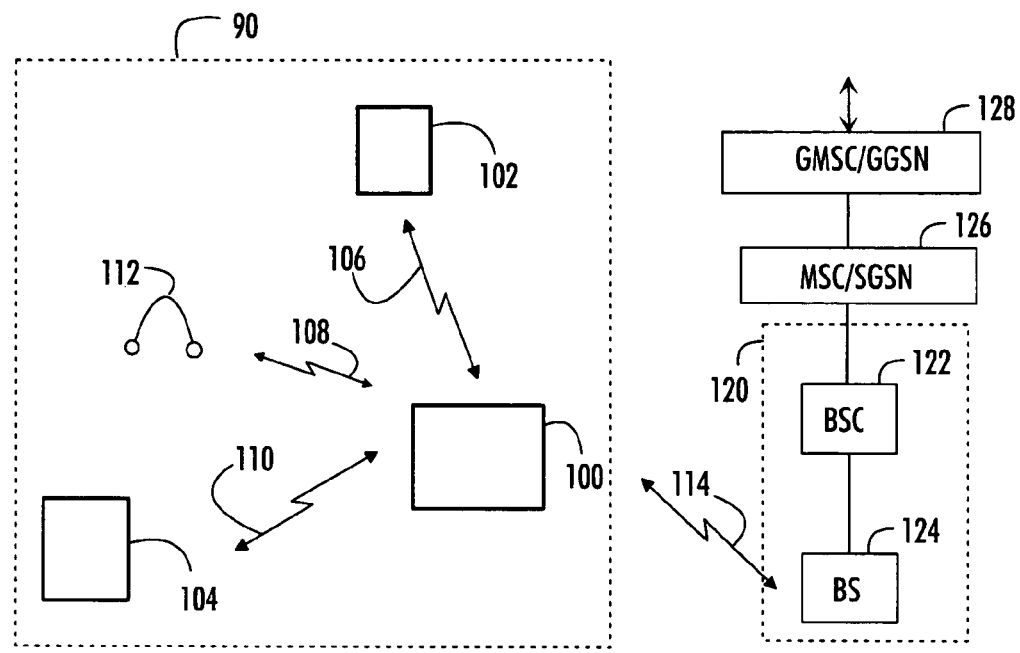

With reference to FIG. 1, let us examine an example of a radio system to which the preferred embodiments of the invention can be applied. The radio system can be based on any transmission system, for example, GSM (Global System for Mobile Communications), WCDMA (Wideband Code Division Multiple Access) or CDMA (Code Division Multiple Access).

A radio terminal equipment arrangement 90 in FIG. 1 comprises radio terminal equipment 100 and a number of secondary units 102, 104, 112. The radio terminal equipment arrangement 90 is a multipart radio terminal, for example. The radio terminal equipment 100, on the other hand, may be a core unit of the multipart radio terminal, a typical mobile phone or a PDA (Personal Digital Assistant), for example. The core unit may have or may not have a user interface of its own. The secondary unit 102, 104, 112 may be another mobile phone or any accessory device that is used with the mobile phone, such as a headset 112. If the radio terminal equipment arrangement 90 is a multipart radio terminal, the secondary units 102, 104, 112 may be peripheral units communicating with the multipart radio terminal. The secondary unit may have wireless or wired connection to the multipart radio terminal equipment. Secondary units having audio characteristics may be classified into three main classes. First, there are secondary units (A) that cannot provide audio characterising information to radio terminal equipment, but they may communicate the desired audio mode (or an identifier) of the secondary unit. Terminal in this case uses preinstalled audio characterising information. The audio characterising information may be already located in the terminal before the secondary audio unit is connected. Secondary units of this class are suitable for the embodiment depicted with the aid of FIG. 2, for example.

Second, there are secondary units (B) that can provide audio characterising information to the radio terminal equipment in a connection establishment phase or any phase during the secondary unit connection. For example, the downloaded information may be changed each time a connection is established.

Third, there are secondary units (C) that may change their audio mode during the connection and that can provide new audio characterising information to the radio terminal equipment according to the secondary unit's current needs. These secondary units are sometimes called advanced secondary units. Secondary units of classes B and C are suitable for the embodiment depicted with the aid of FIG. 3, for instance.

All these secondary units may be used as multipart peripheral units, accessories or enhancements.

A cellular network may correspond to the combined structure of the GSM (Global System for Mobile Communications) and GPRS (General Packet Radio Service) systems, for example. The GSM network elements are responsible for the implementation of circuit-switched connections, and the GPRS network elements are responsible for the implementation of packet-switched connections, some of the network elements, however, being shared by both systems.

A centre 126 represents a mobile services switching centre (MSC) and a serving GPRS support node (SGSN) that enable circuit-switched and packet switched signalling, respectively, in the radio system. The cellular network may comprise a gateway unit 128, which is represented by a gateway mobile service switching centre (GMSC) and a gateway GPRS support node (GGSN). GMSC attends to the circuit-switched connections between the cellular network and external networks, such as a public land mobile network (PLMN) or a public switched telephone network (PSTN), and GGSN attends to the packet-switched connections between the cellular network and external networks, such as the Internet.

The centre 126 controls a radio access network (RAN) 120, which may comprise at least one base station controller 122 controlling at least one base station 124. The base station controller 122 can also be called a radio network controller, and the base station 124 can be called a node B. The radio terminal equipment 100 of the radio terminal equipment arrangement 90 may communicate with at least one base station 124 over a radio interface The secondary units 102, 104, 112 in the radio terminal equipment arrangement 90 may be optimised for specific tasks. One of the secondary units is optimised for making basic phone calls and another secondary unit is optimised for messaging and browsing or for image processing and music, for example. Data may be stored in the secondary unit's own databases. The secondary units 102, 104, 112 communicate with the radio terminal equipment 100 with low-power radio frequency (LPRF) connections 106, 108, 110, such as Bluetooth or WLAN (Wireless Local Area Network) connections. It is also possible that a secondary unit uses wired connection such as USB (universal serial bus) or serial line connection. The radio terminal equipment 100, on the other hand, is configured to communicate with other systems, such as the Internet, for example with LPRF connections and with GSM/GPRS/EDGE connections 114 as well. It is possible that the secondary units 102, 104 also communicate with other systems with GSM/GPRS/EDGE connections, for example. It is also possible that the secondary units 102, 104 are configured to establish outside LPRF connections, such as WLAN connections, to other systems. Also, the radio terminal equipment 100 may establish connections between the secondary units 102, 104 and other systems, such as the Internet or other radio terminals, via a cellular network by using a GSM or a GPRS/EDGE connection 114, for example.

Figure 2:
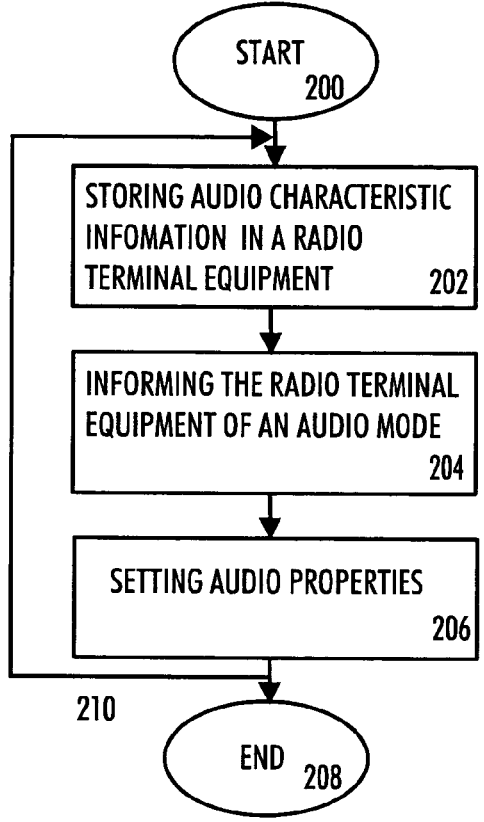
FIG. 2 illustrates an example of a method to control a communication system.

FIG. 2 illustrates an embodiment of a method for controlling a communication system. The system of this embodiment comprises at least one unit of radio terminal equipment and one or more secondary units, which are coupled to the radio terminal equipment. The radio terminal equipment may be a core unit of a multipart radio terminal, a mobile phone or a PDA (Personal Digital Assistant), for example. A secondary unit may be another mobile phone or any accessory device used with the mobile phone having audio characteristics, such as a headset, a loudspeaker or a microphone. If the system is a multipart radio system, the secondary units are typically called peripheral units, accessories or enhancement devices. The method starts in block 200. In block 202, audio characteristic information determining audio modes are stored in the radio terminal equipment. This can be done, for instance, in the secondary unit's connecting phase. The audio modes can be determined in many different ways. One example is to use at least one handsfree mode, at least one handportable mode and at least one wired headset mode. In each mode, the audio characteristics are adjusted to optimise the quality of the audio signal. Audio parameters are, for example, parameters concerning sensitivity, frequency response, echo cancellation, dynamics control and/or noise cancellation in both downlink and uplink direction. The parameters may be determined, for instance, on the basis of simulations, measurements and/or long-term practical experience.

One benefit achieved by storing the parameters determining audio modes in the radio terminal equipment is that there is no need to have a memory unit in a secondary unit, and the message adjusting the audio characteristics can be relatively short, containing only the audio modes.

In block 204, the radio terminal equipment is informed of an audio mode of a secondary unit. The information is typically conveyed by a message containing information on the audio mode needed by a secondary unit. The message is conveyed via a connection, the connection being for instance a radio connection, an infrared connection or a galvanic connection. The information on audio mode can be ciphered while conveyed between the secondary unit and the radio terminal equipment.

In block 206, audio properties of the secondary unit are set by the radio terminal equipment using the audio characteristic information corresponding the informed audio mode. In other words, for example, the information about the audio mode required by the secondary unit has been transmitted and the radio terminal equipment controls the audio characteristics of the secondary unit by using the parameters stored in its memory, which correspond to the informed audio mode. The controlling is carried out by using the connection between the radio terminal equipment and the secondary unit. The purpose is to optimise the quality of an audio signal.

Attention should be paid to the fact that similar secondary units, such as different stereo headset types, may have different audio characteristics or properties. Thus audio characteristics or properties depend on the type of the secondary unit in question.

The embodiment ends in block 208. Arrow 210 depicts one possibility for repeating the embodiment.

Figure 3:
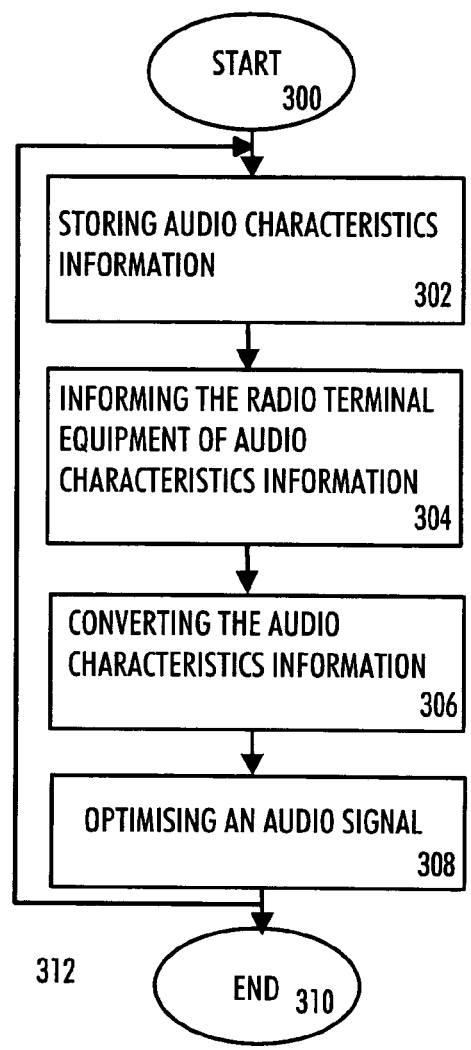
FIG. 3 illustrates another example of a method to control a communication system.

FIG. 3 illustrates another embodiment of a method for controlling a communication system. The system of this embodiment comprises at least one unit of radio terminal equipment and one or more secondary units, which are coupled to the radio terminal equipment. The radio terminal equipment may be the core unit of a multipart radio terminal, a mobile phone or a PDA (Personal Digital Assistant), for example. A secondary unit may be another mobile phone or any accessory device used with the mobile phone having audio characteristics, such as a headset, a loudspeaker, a transducer or a microphone. If the system is a multipart radio system, the secondary units are typically called peripheral units, accessories or enhancement devices. The method starts in block 300.

In block 302, audio characteristics information is stored in a secondary unit. The audio characteristics information may include, for example parameters concerning sensitivity, frequency response, echo cancellation, dynamics control and/or noise cancellation or an audio routing mode, such as mono sound, stereo sound, handsfree or handset mode in uplink and/or downlink direction. The audio parameters may be determined, for instance, on the basis of simulations, acoustical measurements and/or long-term practical experience.

One benefit achieved by storing the audio characteristics information in the secondary unit is that it is possible to use radio terminal equipment, which does not originally have required characteristics, such as software or memory capacity, as a core unit of a multipart system.

In block 304, the radio terminal equipment is informed of the audio characteristics information optimising the audio signal of the secondary unit. The information is typically conveyed by a message containing information on the audio characteristics needed by the secondary unit. The message is transmitted via a connection, the connection being for instance a radio connection, an infrared connection or a galvanic connection. The audio characteristics information can be ciphered while conveyed between the secondary unit and the radio terminal equipment.

In block 306, the audio characteristics information is converted into a form of an audio control algorithm used in the radio terminal equipment for performing a secondary unit audio control algorithm. In the conversion, for example a suitable analogue or digital signal gain can be calculated from sensitivity information in such a way that an appropriate volume level can be achieved or frequency response information can be used to create an equalizer to obtain target frequency response, and an echo canceller can be initialised with echo canceller information.

In block 308, an audio signal of the secondary unit is optimised by using the secondary unit audio control algorithm.

Attention should be paid to the fact that similar secondary units, such as different stereo head set types, may have different audio characteristics or properties. Thus audio characteristics or properties depend on the type of the secondary unit in question. The embodiment ends in block 310. Arrow 312 depicts one possibility for repeating the embodiment.

Figure 4:
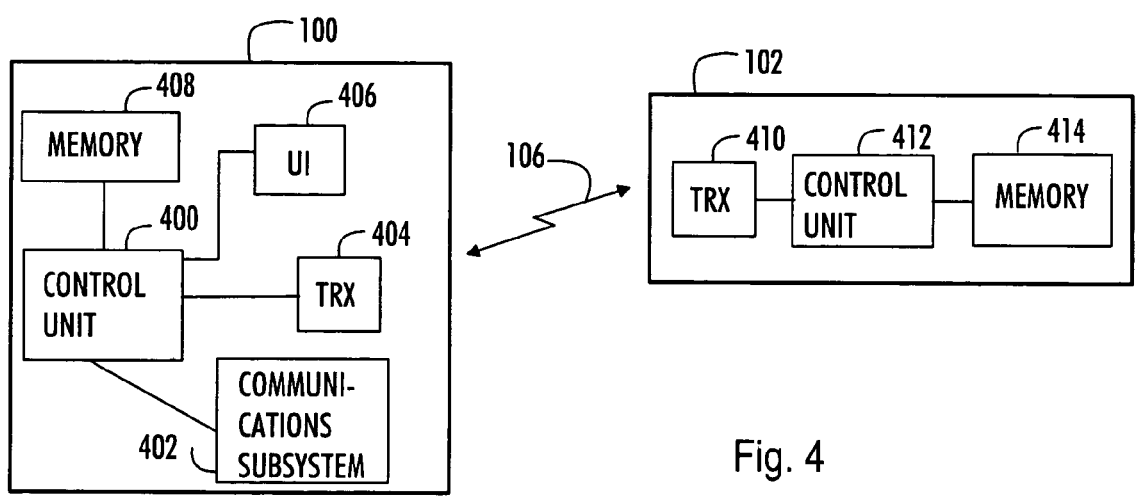
FIG. 4 shows an example of radio terminal equipment and a secondary unit.

A generalised example of radio equipment and a secondary unit is depicted in FIG. 4. The radio terminal equipment 100 is configured to communicate with one or more secondary units 102 by using wireless low-power radio frequency (LPRF) connections 106. The radio connection 106 is established by a transceiver 404. Via the transceiver 404, the radio terminal equipment receives information on an audio mode or audio characterising information. In the example of FIG. 4, the radio terminal equipment 100 comprises at least a control unit 400 for controlling the functions of the radio terminal equipment 100. The control unit 400 is responsible for adjusting audio characteristics of determined secondary units. The radio terminal equipment 100 may also comprise, for example, the following elements: a memory 408 for storing data, such as information on an audio mode or audio characteristic information determining audio modes, a communications subsystem 402, and a user interface 406.

The communications subsystem 402 controls the communication of the radio terminal equipment 100. The user interface 406 of the radio terminal equipment 100 is an interface via which the user can interact with the software of the radio terminal equipment 100 and also with the secondary unit 102. The user interface 406 may comprise, for instance, a display, a loudspeaker and a keypad part. Depending on the type of a device, there may be different user interface parts and a varying number of them.

The secondary unit 102 may correspondingly comprise a transceiver 410 for communicating with the radio terminal equipment 100, a control unit 412 for controlling the functions of the secondary unit 102, and a memory unit 414 for storing different data, such as audio characteristics information.

In a multipart concept, the radio terminal equipment 100 does not typically have a user interface of its own. A user communicates with the system via a user interface located in a secondary device(s).

It is still possible, however, that also the radio terminal equipment 100 has some kind of user interface. In that case, the user may communicate with the system either via the terminal equipment 100 or the secondary device(s) 102.

The control unit 412 may define an audio mode and control message conveying. For example, a user opens the cover of a secondary unit 102, the control unit 412 recognises it and commands the transceiver 410 to send a message to the radio terminal equipment 100, informing about the required audio mode.

The control units 400, 412 of the radio terminal equipment 100 and the secondary unit 102 refer to blocks controlling the operation of the devices and are typically implemented as a processor and software, but different hardware implementations are also feasible, e.g. a circuit built of separate logics components or one or more client-specific integrated circuits (Application-Specific Integrated Circuit, ASIC). A hybrid of these implementations is also feasible.

Even though the invention is described above with reference to an example according to the accompanying drawings, it is clear that the invention is not restricted thereto but it can be modified in several ways within the scope of the appended claims.

The invention claimed is:

1. A method comprising:
   storing in a portable radio unit characteristic information regarding audio modes of at least one portable secondary unit including audio parameter values defining the audio modes, wherein the audio modes comprise at least one of a handsfree mode and a headset mode;
   receiving information identifying an audio mode of at least one portable secondary unit via a wireless connection coupling the at least one portable secondary unit to the portable radio unit; and
   setting audio properties of the at least one portable secondary unit by the portable radio unit by using the stored audio parameter values corresponding to the received information identifying the audio mode of the at least one portable secondary unit,
   wherein when the audio mode of the at least one portable secondary unit is a handsfree mode, stored audio parameter values corresponding to the handsfree mode are provided to the at least one portable secondary unit via the wireless connection, and when the audio mode of the at least one portable secondary unit is a headset mode, stored audio parameter values corresponding to the headset mode are provided to the at least one portable secondary unit via the wireless connection.

2. The method of claim 1, wherein the audio modes further comprise at least one hand-portable mode and at least one wired headset mode.

3. The method of claim 1, wherein the audio characteristic information comprises information concerning sensitivity, frequency response, echo cancellation, dynamics control and noise cancellation.

4. The method of claim 1, wherein the wireless connection via which the portable radio unit is informed of the audio mode of the at least one portable secondary unit comprises at least one of a radio connection and an infrared connection.

5. The method of claim 1, wherein setting audio properties of the at least one portable secondary unit comprises wirelessly transmitting the stored audio parameter values corresponding to the received information identifying the audio mode of the at least one portable secondary unit to the at least one portable secondary unit.

6. A method comprising:
   storing characteristic information regarding audio modes of at least one portable secondary unit including audio parameter values defining the audio modes in the at least one portable secondary unit, which portable secondary unit is coupled via a wireless connection to a portable radio unit, wherein the audio modes comprise at least one of a handsfree mode and a headset mode;
   informing the portable radio unit of an audio mode of the at least one portable secondary unit including audio parameter values, wherein when the audio mode of the at least one portable secondary unit is a handsfree mode, stored audio parameter values corresponding to the handsfree mode are provided to the portable radio unit via the wireless connection, and when the audio mode of the at least one portable secondary unit is a headset mode, stored audio parameter values corresponding to the headset mode are provided to the portable radio unit via the wireless connection;
   converting the audio parameter values into a form of an audio control algorithm used in the portable radio unit for performing a secondary unit audio control algorithm;
   controlling an audio signal of the at least one portable secondary unit by using the secondary unit audio control algorithm at the portable radio unit.

7. The method of claim 6, wherein the audio characteristics information comprises information concerning sensitivity, frequency response, echo cancellation, dynamics control, noise cancellation or an audio routing mode.

8. The method of claim 6, wherein the wireless connection via which the portable radio unit is informed of the audio characteristics information comprises at least one of a radio connection and an infrared connection.

9. The method of claim 6, wherein the audio characteristics information is ciphered while conveyed between the portable secondary unit and the portable radio unit.

10. An apparatus comprising:
    a memory configured to store characteristic information regarding audio modes of the apparatus, the information including audio parameter values defining the audio modes, wherein the audio modes comprise at least one of a handsfree mode and a headset mode;
    a transceiver configured to inform a portable radio unit to which the apparatus is coupled via a wireless connection of an audio mode of the apparatus for controlling an audio signal of the apparatus,
    wherein when the audio mode of the apparatus is a handsfree mode, stored audio parameter values corresponding to the handsfree mode are provided to the portable radio unit via the wireless connection, and when the audio mode of the apparatus is headset mode, stored audio parameter values corresponding to the headset mode are provided to the portable radio unit via the wireless connection.

11. The apparatus of claim 10, wherein the audio characteristics information comprises parameters concerning sensitivity, frequency response, echo cancellation, dynamics control, noise cancellation or an audio routing mode.

12. The apparatus of claim 10, wherein the wireless connection via which the portable radio unit is informed of the audio characteristics information comprises at least one of a radio connection and an infrared connection.

13. The apparatus of claim 10, wherein controlling of an audio signal of the apparatus comprises using an audio control algorithm corresponding to the transmitted information identifying the audio mode of the apparatus.

14. A portable radio unit comprising:
a memory configured to store characteristic information regarding audio modes of at least one portable secondary unit, the information including audio parameter values defining the audio modes, wherein the audio modes comprise at least one of a handsfree mode and a headset mode;
a transceiver configured to receive information identifying an audio mode of at least one portable secondary unit, which at least one portable secondary unit is coupled to the portable radio unit via a wireless connection;
a control unit configured to set audio properties of the at least one portable secondary unit by using the stored characteristic information corresponding to the received information identifying the audio mode of the at least one portable secondary unit,
wherein when the audio mode of the at least one portable secondary unit is a handsfree mode, stored audio parameter values corresponding to the handsfree mode are provided to the at least one portable secondary unit via the wireless connection, and when the audio mode of the at least one portable secondary unit is a headset mode, store audio parameter values corresponding to the headset mode are provided to the at least one portable secondary unit via the wireless connection.

15. The portable radio unit of claim 14, wherein the audio modes further comprise at least one hand-portable mode and at least one wired headset mode.

16. The portable radio unit of claim 14, wherein the connection via which the portable radio unit is informed of the audio mode of the at least one portable secondary unit comprises at least one of a radio connection and an infrared connection.

17. An apparatus comprising:
a transceiver configured to receive information on an audio mode of at least one portable secondary unit, the information including audio parameter values for controlling an audio signal of the at least one portable secondary unit, which at least one portable secondary unit is coupled to the apparatus via a wireless connection, wherein the audio mode is one of audio modes comprising at least one of a handsfree mode and a headset mode;
a control unit configured to convert the audio parameter values into a form of an audio control algorithm used in the apparatus for performing a secondary unit audio control algorithm; and to control an audio signal of the at least one portable secondary unit by using the secondary unit audio control algorithm,
wherein when the audio mode of the at least one portable secondary unit is a handsfree mode, corresponding audio parameter values are received from the at least one portable secondary unit via the wireless connection, and when the audio mode of the at least one portable secondary unit is a headset mode, corresponding audio parameter values are received from the at least one portable secondary unit via the wireless connection.

18. The apparatus of claim 17, wherein the information comprises parameters concerning sensitivity, frequency response, echo cancellation, dynamics control, noise cancellation or an audio routing mode.

19. The apparatus of claim 17, wherein the connection via which the apparatus is informed of the information comprises at least one of a radio connection and an infrared connection.

* * * * *